US010766422B2

(12) United States Patent
Gao et al.

(10) Patent No.: US 10,766,422 B2
(45) Date of Patent: *Sep. 8, 2020

(54) IR TRANSMITTING COATING FOR ELECTRO-OPTIC ELEMENT

(71) Applicant: Gentex Corporation, Zeeland, MI (US)

(72) Inventors: Jian Gao, Holland, MI (US); Andrew D. Weller, Holland, MI (US); George A. Neuman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 354 days.

This patent is subject to a terminal disclaimer.

(21) Appl. No.: 15/372,717

(22) Filed: Dec. 8, 2016

(65) Prior Publication Data

US 2017/0166134 A1 Jun. 15, 2017

Related U.S. Application Data

(60) Provisional application No. 62/266,065, filed on Dec. 11, 2015.

(51) Int. Cl.
*B60R 1/12* (2006.01)
*G02F 1/153* (2006.01)
(Continued)

(52) U.S. Cl.
CPC ............... *B60R 1/12* (2013.01); *B60R 1/04* (2013.01); *G02F 1/15* (2013.01); *G02F 1/153* (2013.01);
(Continued)

(58) Field of Classification Search
None
See application file for complete search history.

(56) References Cited

U.S. PATENT DOCUMENTS 5,928,572 A 7/1999 Tonar et al.
5,998,617 A 12/1999 Srinivasa et al.
(Continued)

FOREIGN PATENT DOCUMENTS

DE 102008010047 A1 8/2009
JP 2011527773 A 11/2011
(Continued)

OTHER PUBLICATIONS

International Search Report and Written Opinion of the International Searching Authority, or the Declaration, dated Apr. 6, 2017, for International Application No. PCT/US2016/065699, filed Dec. 9, 2016, 9 pages.

(Continued)

*Primary Examiner* — Stuart D Bennett
(74) *Attorney, Agent, or Firm* — Price Heneveld LLP; Bradley D. Johnson

(57) ABSTRACT

The disclosure provides for an electrochromic element comprising a first substrate and a second substrate. The first substrate comprises a first surface and a second surface. The second substrate comprises a third surface and a fourth surface. The first substrate and the second substrate form a cavity have an electrochromic medium disposed therein. A dielectric coating is disposed on the fourth surface and is configured to provide for improved transmittance of the electrochromic element in the near infrared (NIR) range, wherein the near infrared transmittance exceeds the visible transmittance.

16 Claims, 7 Drawing Sheets

(51) Int. Cl.
  *B60R 1/04*    (2006.01)
  *G02F 1/15*    (2019.01)
  *G06K 9/00*    (2006.01)
  *H04N 5/33*    (2006.01)
  *G02F 1/1514*    (2019.01)
  *H04N 5/232*    (2006.01)

(52) U.S. Cl.
  CPC ....... *G02F 1/1533* (2013.01); *G06K 9/00604* (2013.01); *G06K 9/00617* (2013.01); *G06K 9/00832* (2013.01); *H04N 5/33* (2013.01); *B60R 2001/1253* (2013.01); *G02F 2001/1536* (2013.01); *G02F 2001/15145* (2019.01); *G02F 2203/11* (2013.01); *H04N 5/23293* (2013.01)

(56) References Cited

U.S. PATENT DOCUMENTS

| | | |
|---|---|---|
| 6,020,987 A | 2/2000 | Baumann et al. |
| 6,037,471 A | 3/2000 | Srinivasa et al. |
| 6,137,620 A | 10/2000 | Guarr et al. |
| 6,141,137 A | 10/2000 | Byker et al. |
| 6,193,912 B1 | 2/2001 | Thieste et al. |
| 6,241,916 B1 | 6/2001 | Claussen et al. |
| 6,249,369 B1 | 6/2001 | Thieste et al. |
| 6,519,072 B2 | 2/2003 | Nishikitani et al. |
| 6,572,233 B1 | 6/2003 | Northman et al. |
| 7,274,501 B2 | 9/2007 | McCabe et al. |
| 8,201,800 B2 | 6/2012 | Filipiak |
| 8,210,695 B2 | 7/2012 | Roth et al. |
| 8,237,909 B2 | 8/2012 | Ostreko et al. |
| 8,264,761 B2 | 9/2012 | Cammenga et al. |
| 8,339,526 B2 | 12/2012 | Minikey, Jr. et al. |
| 8,411,245 B2 | 4/2013 | Lee et al. |
| 8,643,931 B2 | 2/2014 | Cammenga et al. |
| 8,646,924 B2 | 2/2014 | Roth et al. |
| 8,814,373 B2 | 8/2014 | Steel et al. |
| 8,827,517 B2 | 9/2014 | Cammenga et al. |
| 8,885,240 B2 | 11/2014 | Roth et al. |
| 8,902,486 B1 | 12/2014 | Chandrasekhar |
| 8,925,891 B2 | 1/2015 | Van Huis et al. |
| 8,960,629 B2 | 2/2015 | Rizk et al. |
| 9,174,577 B2 | 11/2015 | Busscher et al. |
| 9,244,249 B2 | 1/2016 | Kim et al. |
| 2006/0050356 A1* | 3/2006 | Varaprasad ............ G02F 1/157 359/265 |
| 2009/0015736 A1* | 1/2009 | Weller ...................... B60R 1/12 349/11 |
| 2009/0296190 A1* | 12/2009 | Anderson ............. B32B 27/304 359/247 |
| 2012/0033287 A1 | 2/2012 | Friedman et al. |
| 2012/0281268 A1 | 11/2012 | McCabe et al. |
| 2012/0327234 A1 | 12/2012 | Fish, Jr. et al. |
| 2013/0005135 A1* | 1/2013 | Krasnov ............... H01L 51/442 438/609 |
| 2014/0036339 A1 | 2/2014 | Tonar et al. |
| 2014/0211492 A1 | 7/2014 | Neuman et al. |
| 2015/0309314 A1 | 10/2015 | Border et al. |
| 2015/0355518 A1 | 12/2015 | McCabe et al. |
| 2017/0061110 A1 | 3/2017 | Wright et al. |
| 2017/0177935 A1 | 6/2017 | Weller et al. |

FOREIGN PATENT DOCUMENTS

| | | |
|---|---|---|
| WO | 9842796 A1 | 10/1998 |
| WO | 9902621 A1 | 1/1999 |

OTHER PUBLICATIONS

Commonly assigned co-pending U.S. Appl. No. 15/372,875, filed Dec. 8, 2015.
Commonly assinged co-pending U.S. Appl. No. 15/443,164, filed Feb. 27, 2017.
Commonly assigned co-pending U.S. Appl. No. 62/463,218, filed Feb. 24, 2017.

* cited by examiner

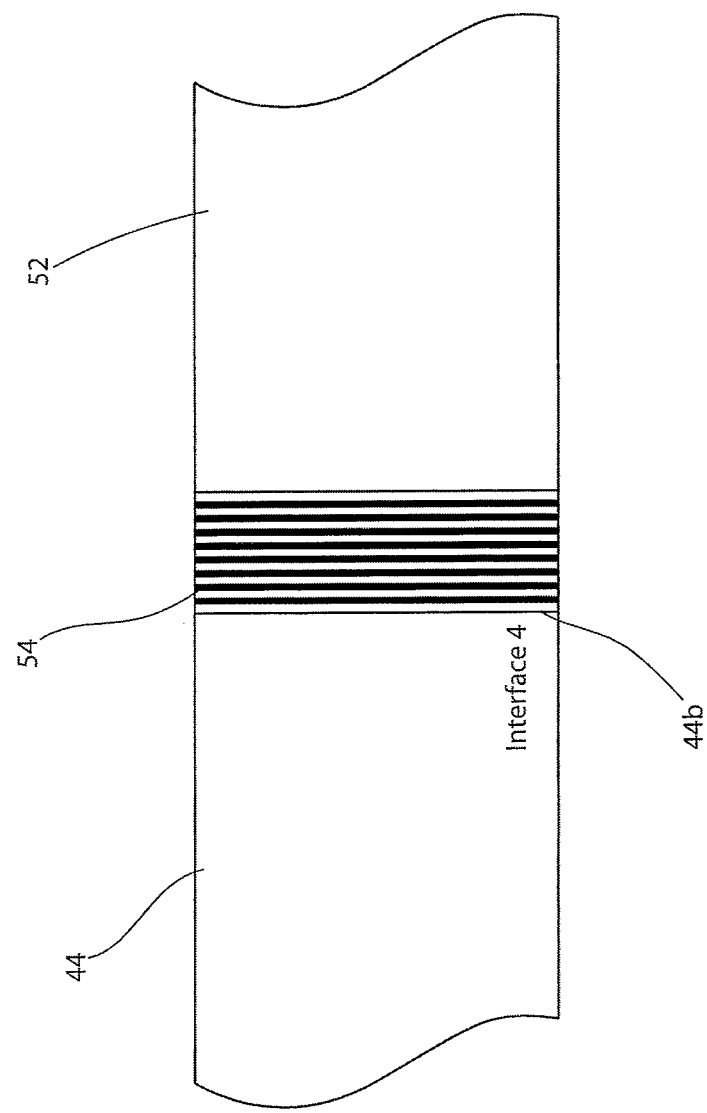

IR TRANSMITTING COATING FOR ELECTRO-OPTIC ELEMENT

CROSS-REFERENCE TO RELATED APPLICATION

This application claims priority to U.S. Provisional Application No. 62/266,065, filed on Dec. 11, 2015, entitled "IR TRANSMITTING COATING FOR ELECTRO-OPTIC ELEMENT," the disclosure of which is hereby incorporated herein by reference in its entirety.

TECHNOLOGICAL FIELD

The present invention generally relates to a mirror assembly, and more particularly, to a transflective mirror assembly with improved near infrared transmittance.

SUMMARY OF THE DISCLOSURE

According to one aspect of the present disclosure, a mirror assembly is disclosed. The mirror assembly comprises an electrochromic element comprising a first substrate and a second substrate. The first substrate comprises a first surface and a second surface. The second substrate comprises a third surface and a fourth surface. The first substrate and the second substrate form a cavity having an electrochromic medium disposed therein. A dielectric coating is disposed on the fourth surface and is configured to provide for visible transflective properties and improved transmittance of the electrochromic element in the near infrared (NIR) range wherein the near infrared transmittance exceeds the visible transmittance.

According to another aspect of the present disclosure, an electrochromic mirror system is disclosed. The system comprises an electrochromic element comprising a first substrate comprising a first surface and a second surface. The electrochromic element further comprises a second substrate comprising a third surface and a fourth surface, wherein the first substrate and the second substrate form a cavity between the second surface and the third surface. An electrochromic medium is contained in the cavity. A transflective dielectric coating is disposed at the fourth surface. The system further comprises an image sensor directed toward the fourth surface of the electrochromic element. The image sensor comprises an emitter configured to emit light in a NIR range.

According to yet another aspect of the present disclosure, an electrochromic mirror system is disclosed. The system comprises an electrochromic element comprising a first substrate comprising a first surface and a second surface. The electrochromic element further comprises a second substrate comprising a third surface and a fourth surface, wherein the first substrate and the second substrate form a cavity between the second surface and the third surface. An electrochromic medium is contained in the cavity. A transflective dielectric coating is disposed at the fourth surface. The transflective dielectric coating comprises a multi-layer stack comprising alternating high-index (H) and low-index (L) materials. The system further comprises an image sensor directed toward the fourth surface.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 4 is a cross-section view of a dielectric coating incorporated on a transflective mirror assembly;

DETAILED DESCRIPTION

Figure 1:
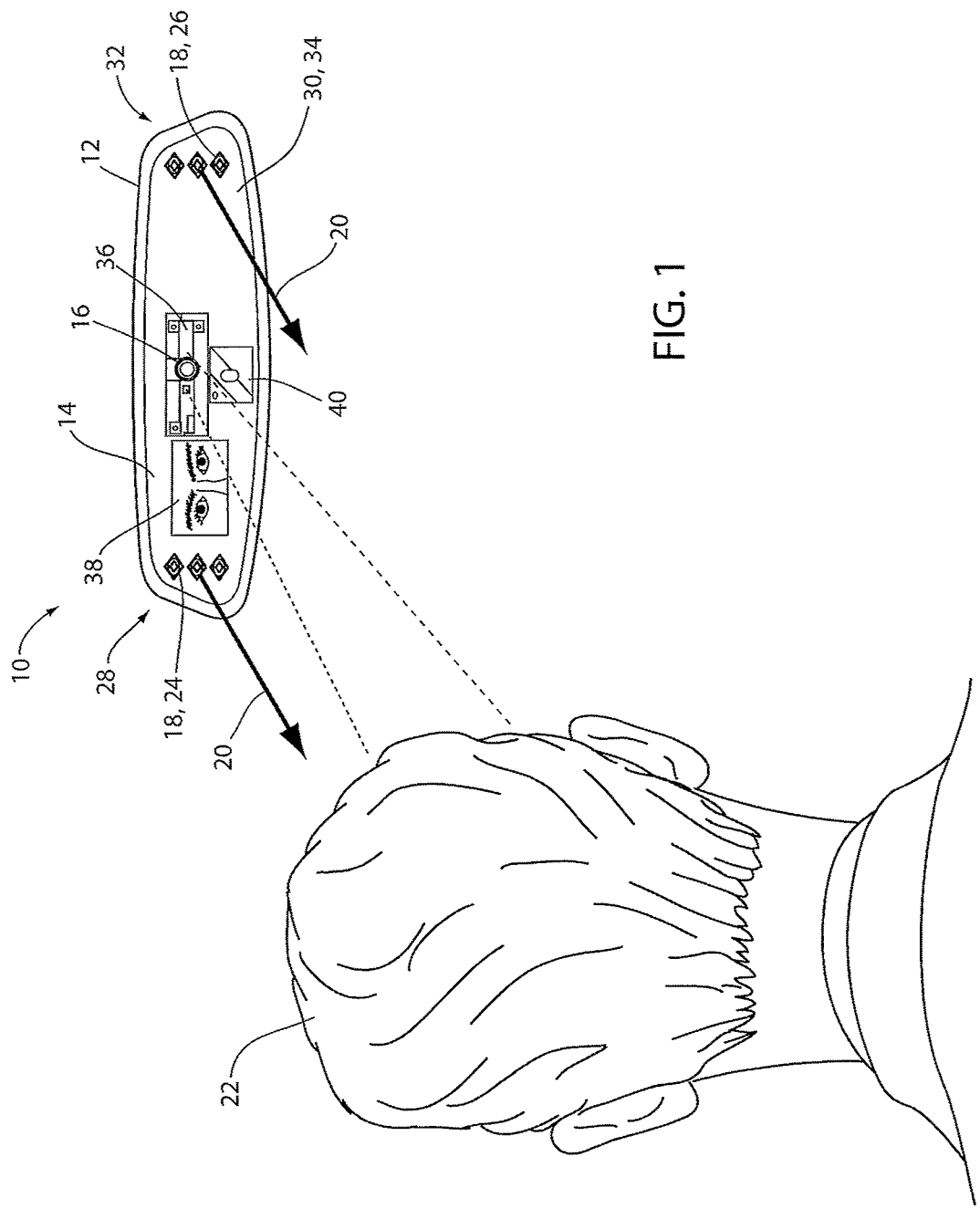
FIG. 1 is a projected view of an electro-optic assembly incorporated in an interior rearview mirror assembly.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIG. 1, the disclosure may provide for a scanning apparatus 10 operable to perform an identification function. In an exemplary embodiment, the scanning apparatus 10 may be incorporated in a rearview mirror assembly 12 comprising an electro-optic assembly 14 for an automotive vehicle. The electro-optic assembly 14 may contain various forms of transflective mirror devices and in some embodiments may comprise an electrochromic (EC) mirror. In this configuration, the electro-optic assembly 14 may be an electrochromic mirror element which can vary in reflectivity in response to a control signal from a control. The control signal may change an electrical potential supplied to the electro-optic assembly 14 to control the reflectivity.

The scanning apparatus 10 may be configured to process and/or control an identification function. The identification function may comprise an eye-scan or retinal identification function. In this configuration, the scanning apparatus 10 may provide for the interior rearview mirror assembly 12 to be configured to identify an operator or passenger of a vehicle based on the eye-scan identification function. The identification function may be processed by the controller and/or communicated from the controller to one or more vehicle systems to provide for an identification of the operator or passenger of the vehicle.

The eye-scan-identification function may utilize an infrared illumination of an iris of an eye for the identification. The illumination of the eye(s) may be optimized in conditions allowing for a high optical transmittance in the near infrared (NIR) range. Accordingly, the disclosure provides for an electrochromic (EC) stack of the electro-optic assembly that may have a high light transmittance in wavelengths ranging from about 800 nm to 940 nm in the optical spectrum. Additionally, in some implementations, the electro-optic assembly may comprise a plurality of light sources configured to illuminate at least one iris of the operator of the vehicle.

To provide for the eye-scan-identification function, for example an iris or retinal scan, an image sensor 16 may be disposed proximate a rear surface of the electro-optic assembly. The image sensor 16 may correspond to, for example, a digital charge-coupled device (CCD) or complementary metal-oxide-semiconductor (CMOS) active pixel sensor, although not be limited to these exemplary devices. The image sensor 16 may be in communication with at least one light source 18, which may correspond to one or more infrared emitters configured to output an emission 20 of light in the NIR range. In this configuration, the image sensor 16 may be configured to selectively activate the one or more infrared emitters corresponding to the at least one light source 18 to illuminate the iris such that an identity of an operator 22 of the vehicle may be determined.

The infrared emitters or the light sources 18 may correspond to a plurality of infrared emitter banks. Each of the infrared emitter banks may comprise a plurality of light emitting diodes, which may be grouped in a matrix or otherwise grouped and disposed behind a rear surface of the electro-optic device. In an exemplary embodiment, the plurality of light sources 18 may correspond to a first emitter bank 24 and a second emitter bank 26. The first emitter bank 24 may be configured to output the emission in the NIR range from a first side portion 28 of a front surface 30 of the electro-optic assembly 14. The second emitter bank 26 may be configured to output the emission in the NIR range from a second side portion 32 of the front surface 30 of the electro-optic assembly 14, which may comprise a mirror element 34 of the mirror assembly 12. In this configuration, the scanning apparatus 10 may be configured to illuminate the eyes of the operator 22 such that the image sensor 16 may capture an image of the irises of the eyes.

In an exemplary embodiment, each of the first emitter bank 24 and/or the second emitter bank 26 may correspond to more or fewer LEDs or banks of LEDs. In some embodiments comprising an electro-optic assembly having a high level of transmittance in the NIR range, the scanning apparatus 10 may utilize fewer or less intense LEDs. Electro-optic assemblies having a high level of transmittance in the NIR range may correspond to assemblies comprising a transflective dielectric coating disposed on a fourth surface of the electro-optic assembly.

In some embodiments comprising an electro-optic assembly having a lower level of transmittance in the NIR range, the scanning apparatus 10 may utilize a greater number of or more intense LEDs. Electro-optic assemblies having a lower level of transmittance in the NIR range may correspond to assemblies comprising a metal-based, transflective coating disposed on a third surface of the electro-optic assembly. Further details of the electro-optic assembly are discussed in reference to FIGS. 2 and 4.

The image sensor 16 may be disposed on a circuit 36, for example a printed circuit board in communication with a controller. The controller may further be in communication with various devices that may be incorporated in the vehicle via the communication bus or any other suitable communication interface. The controller may correspond to one of more processors or circuits, which may be configured to process image data received from the image sensor 16. In this configuration, the image data may be communicated from the image sensor 16 to the controller. The controller may process the image data with one or more algorithms configured to determine an identity of the operator of the vehicle.

The controller may further be in communication with a display 38. The display 38 may be disposed in the mirror assembly 12 behind the rear surface. The controller may be operable to display the image data received from the image sensor 16 such that the operator may view the image data. In this configuration, the operator 22 may adjust a position of the eyes shown on the display 38 to position the eyes such that the image data may include the necessary features required to identify the operator. In an exemplary embodiment, the features required to identify the operator of the vehicle may correspond to features of the eyes of the operator 22 (e.g. the irises).

The display 38 may correspond to a partial or full display mirror configured to display an image data through at least a portion of the mirror assembly 12. The display 38 may be constructed utilizing various technologies, for example LCD, LED, OLED, plasma, DLP or other display technology. Examples of display assemblies that may be utilized with the disclosure may include U.S. Pat. No. 6,572,233 "Rearview display mirror," U.S. Pat. No. 8,237,909 entitled "Vehicular rearview mirror assembly 12 including integrated backlighting for a liquid crystal display (LCD)," U.S. Pat. No. 8,411,245 "Multi-display mirror system and method for expanded view around a vehicle," and U.S. Pat. No. 8,339,526 "Vehicle rearview mirror assembly 12 including a high intensity display," which are incorporated herein by reference in their entirety.

The scanning apparatus 10 may further comprise an indicator 40 in the mirror assembly 12. The indicator 40 may be in communication with the controller and configured to output a signal to identify a state of the scanning apparatus 10 and/or a rearview camera as discussed in reference to FIG. 4. The indicator may correspond to a light source that may be operable to flash and/or change colors to communicate a state of the scanning apparatus 10. The indicator 40 may correspond to a light emitting diode (LED), and in an exemplary embodiment, the indicator 40 may correspond to a red, green, and blue (RGB) LED operable to identify the state of the scanning apparatus 10 by outputting one of more colored emissions of light.

Figure 2:
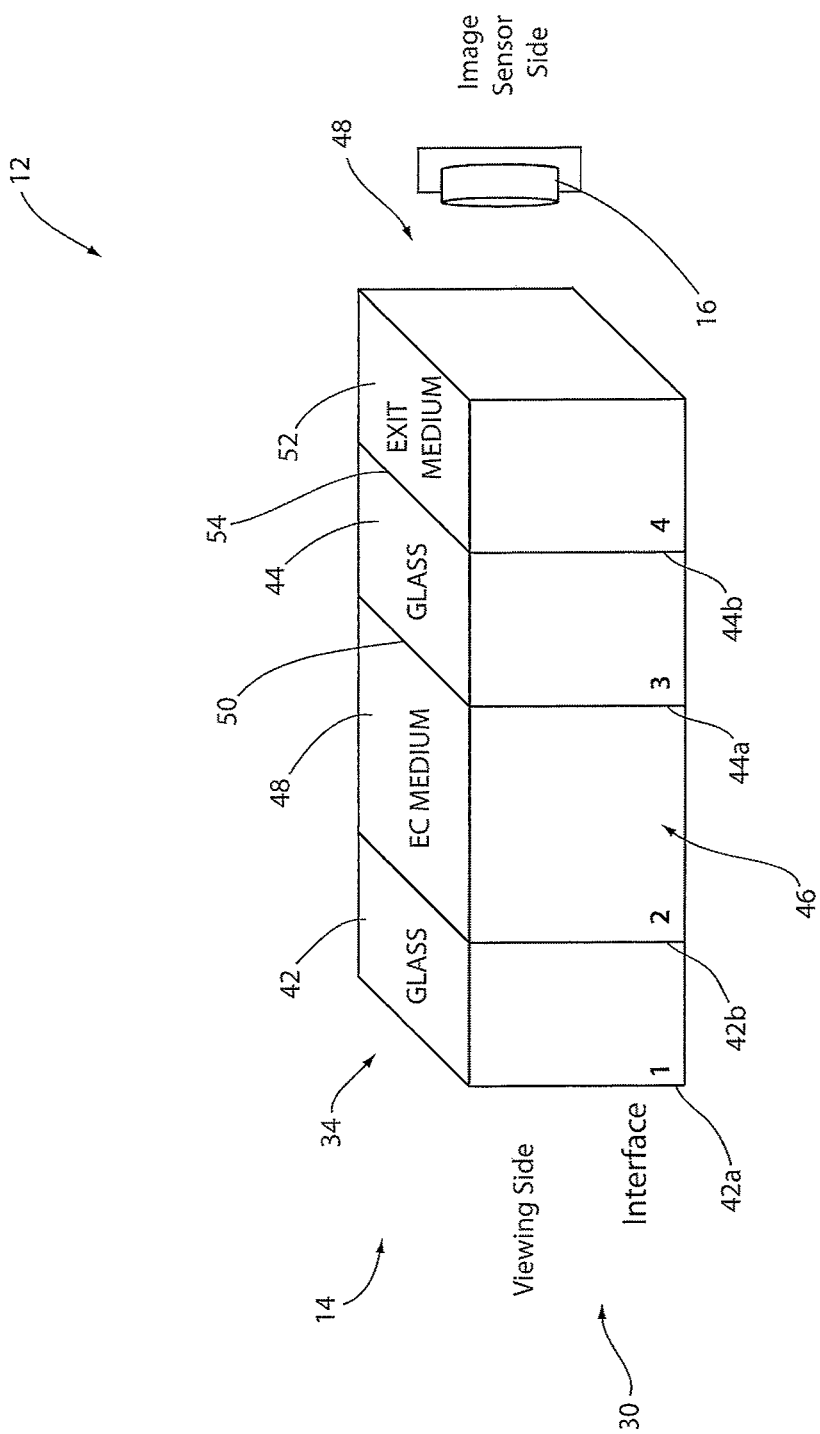
FIG. 2 is a cross-section view of a transflective mirror assembly.

Referring to FIG. 2, a cross-sectional view of a mirror assembly 12 is shown. The electro-optic assembly 14 may be partially reflective and partially transmissive and comprise the mirror element 34. The mirror element 34 may include a first substrate 42 having a first surface 42a and a second surface 42b. The mirror element 34 may further comprise a second substrate 44 having a third surface 44a and a fourth surface 44b. The first substrate 42 and the second substrate 44 may define a cavity 46 and may be substantially parallel. The first surface 42a and the third surface 44a may be oriented toward the front surface 30 of the mirror assembly 12. The second surface 42b and the fourth surface 44b may be oriented toward a rear surface of the mirror assembly 12.

The cavity 46 may contain an electro-optic medium 48, such as, but not limited to, an electrochromic medium. The cavity 46 may be completely or partially filled with the medium 48. The mirror assembly 12 may be in communication with a dimming controller via electrical contacts and may comprise various seals to retain the medium 48 in the cavity 46. In this configuration, the mirror assembly 12 may be configured to vary in reflectance in response to a control signal received from the dimming controller via the electrical contacts.

Figure 3:
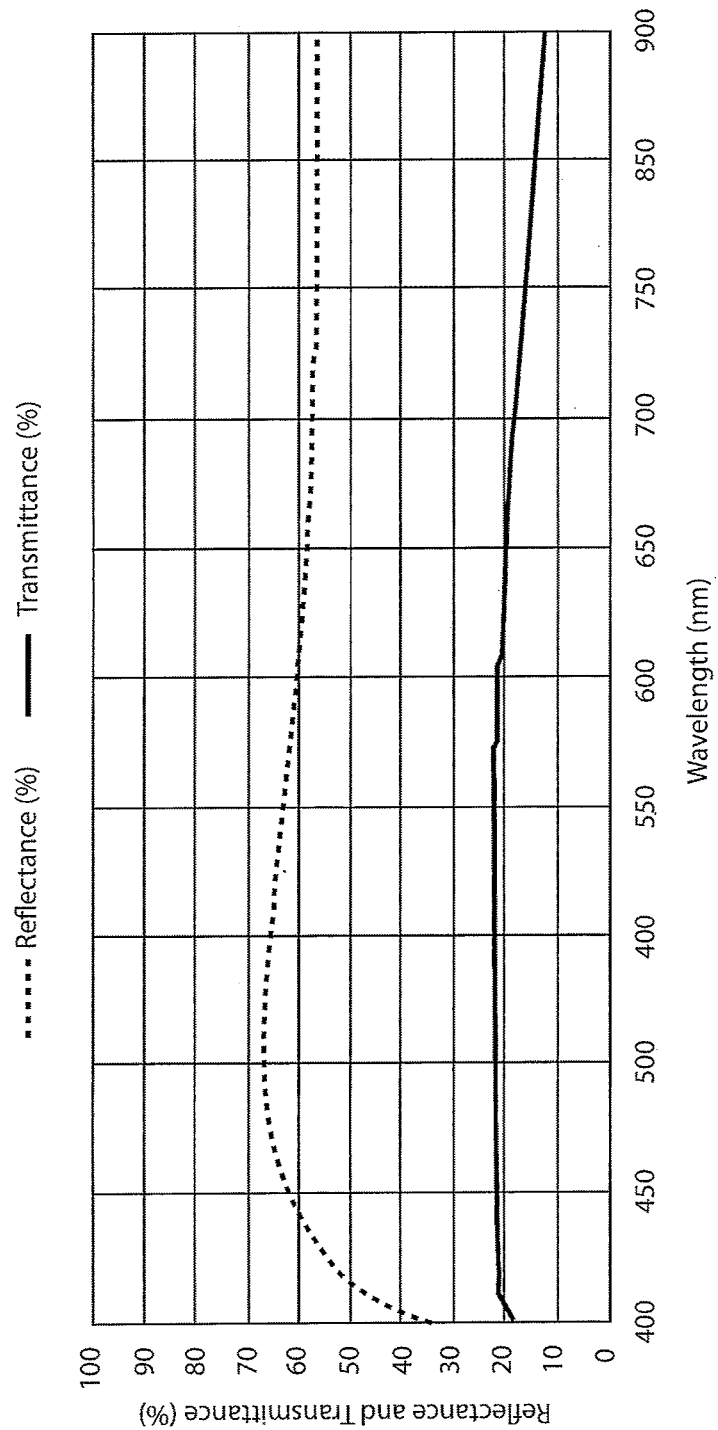
FIG. 3 is a graph illustrating the reflectance and transmittance spectra of a conventional electro-chromic (EC) mirror.

Each of the surfaces 42a, 42b, 44a, and 44b corresponds to interfaces of the mirror assembly 12. The first surface 42a corresponds to a first interface 1. The second surface 42b corresponds to a second interface 2. The third surface 44a corresponds to a third interface 3, and the fourth surface 44b corresponds to a fourth interface 4. In a conventional electro-optic assembly, a transflective coating 50 may typically be disposed on the third interface 3. The transflective coating may typically comprise a layer containing silver along with additional layers such as metal, dielectric and/or transparent conducting oxides located above or below the silver comprising layer or both. As shown in Table 1, the electrochromic element with a transflective coating 50 may generally have a nominal reflectance of 65% and a nominal transmittance of 22% in the visible range. The visible reflectance and transmittance may vary depending on design considerations and design objectives. However, in the NIR range, the transmittance will typically be less than the transmittance in the visible spectrum and may be less than 20% as illustrated in FIG. 3. The relatively low transmittance in the NIR range may be due to the thickness and optical constants of materials comprising the metal-based, transflective coating.

TABLE 1

Visible optical properties of transflective mirror with a metal-based, transflective coating 29.

|    | Reflectance | Transmittance |
|----|-------------|---------------|
| Y  | 65.00       | 21.86         |
| L* | 84.48       | 53.88         |
| a* | −4.35       | −0.31         |
| b* | 3.65        | 0.82          |

The metal-based, transflective coating 50 may inhibit the light source 18 and reduce the intensity of the energy of the light source 18 reaching the subject if the light source is configured in the mirror assembly 12 rearward of, and transmitting through, the electrochromic element. Additionally, the metal-based, transflective coating 50 may inhibit a returning signal to be captured by a receiver of the image sensor 16 if it is also configured to be rearward of the transflective electrochromic element. Maintaining a neutral color in the reflected and transmitted spectrums of the image sensor 16 requires precise engineering of the coating materials and thicknesses on each of the interfaces 1-4. Such precision prevents color bias of the mirror and devices, such as the image sensor 16, configured rearward of the electrochromic element.

Referring now to FIG. 4, in some embodiments, the transflective coating may be implemented as a transflective dielectric coating 54 that may be applied to the fourth interface 4. The transflective dielectric coating 54 would be used to replace the metal-based, transflective coating 50 as demonstrated in FIG. 2. Transflective dielectric coating 54 is designed to resolve the issues related to the limited transmission in the NIR range for the mirror assembly 12 and provide NIR transmittance greater than about 20%. The dielectric coating 54 is designed to attain a reflectance level comparable to industry standard, i.e., about 40% to 85%, or about 50% to 75%, or about 55% to 70%. Additionally, the dielectric coating can be designed to attain a neutral color appearance in the visible color range for normal incidence viewing angle up to broad viewing angles. In this way, the disclosure provides for improved transmittance in the NIR range while maintaining visible color performance and mirror functionality.

The transflective dielectric coating 54 may comprise low-loss dielectric materials configured in an alternating high and low refractive index multi-layer stack. Examples of low-loss dielectric materials include, but are not limited to, niobium oxide, silicon oxide, tantalum oxide, aluminum oxide, etc. Additionally, with the tuning flexibility in an alternating high-index (H) and low-index (L) material multilayer (HL-Stack) construction, the transmittance of the dielectric coating 54 in the NIR range can be above 30% in some embodiments. In some embodiments, the NIR transmittance of the dielectric coating 54 may be greater than 50%. In an exemplary embodiment, the NIR transmittance of the dielectric coating 54 may be greater than 70%. In other embodiments, the NIR transmittance, for at least some wavelengths between about 800 and 940 nm, is greater than the visible transmittance, greater than 1.5 times the visible transmittance and greater than 2 times the visible transmittance.

An example of the dielectric coating 40 exhibiting the transmittance in the NIR range greater than 70% is shown in FIG. 4. Due to the low electric conductivity of the dielectric materials utilized in the dielectric coating 40, the dielectric coating 40 is not ideal for use as transflective electrode on surface 3 but may be utilized on the fourth interface 4. The dielectric coating 40 may be disposed on the fourth interface 4. On surface 3, an alternate transparent electrode, such as ITO, can be used to maintain the necessary high electric conductivity for the surface 3 electrode. The high electrical conductivity is required at the third interface to supply electrical current to the electro-optic medium 26 in order for the change in chemical state to occur.

Table 2 provides detailed, representative, examples of stack designs of dielectric transflective coatings at the fourth interface 4 of the mirror assembly 12 that provide appropriate visible transflective properties and enhanced NIR transmittance. In these examples, the high refractive index (H) material is Niobium Oxide and the low refractive index (L) material is Silicon Dioxide. It should be understood that these two examples are not meant to be limiting. Alternate dielectric coatings may have a quantity of layers between 3 and 14 or more than 14 layers. The number of layers needed to achieve the design goals will vary with the selection of the high and low refractive index materials. Fewer layers may be needed as the difference in refractive index between the two materials increases. Conversely, more layers may be needed if the refractive index difference is less. The refractive index difference may be greater than about 0.4, greater than about 0.6 or greater than about 0.8. Additional materials may be added which have refractive indices different that the high and low index materials.

TABLE 2

Dielectric transflective coating designs at the fourth interface of the mirror assembly.

| Front | Glass | | | |
|---|---|---|---|---|
| Layer No. | 5-layer Design | | 14-layer Design | |
| 1 | H | 98 nm | H | 56 nm |
| 2 | L | 100 nm | L | 27 nm |
| 3 | H | 51 nm | H | 58 nm |
| 4 | L | 91 nm | L | 72 nm |
| 5 | H | 50 nm | H | 56 nm |
| 6 | — | — | L | 103 nm |
| 7 | — | — | H | 75 nm |
| 8 | — | — | L | 130 nm |
| 9 | — | — | H | 17 nm |
| 10 | — | — | L | 178 nm |
| 11 | — | — | H | 59 nm |
| 12 | — | — | L | 25 nm |
| 13 | — | — | H | 17 nm |
| 14 | — | — | L | 175 nm |
| Back | Exit Medium | | | |

A theoretical performance in the visible range of the mirror assembly 12 with these example dielectric transflective coatings 40 are given in Table 3. The modeled mirror assembly comprises a first piece of 1.6 mm glass with an ITO layer on surface 2 that is approximately 145 nm thick, a second piece of 1.6 mm glass with an ITO layer on surface 3 that is approximately 145 nm thick, a cell spacing (distance between surfaces 2 and 3) of about 140 microns, a perimeter seal of epoxy to create a chamber between the two pieces of glass and the chamber is filled with a gel based electrochromic media, which is further discussed herein. The dielectric, multi-layer coating is on surface 4. The visible reflectance is maintained at 50-60% and visible transmittance is 30-40%. The CIELAB color coordinates $a^*$ and $b^*$ are maintained as small values (between −5 and 5) for both transmission and reflection spectra of 5 and 14 layer designs, which indicates good color neutral appearance. When changing the viewing angle, the spectrum usually shifts toward the short wavelength region of the visible spectrum and the different polarization states (electro-magnetic waves oscillating in orthogonal directions) typically react differently. Thus, both contribute to a color biasing of the spectra causing a color change on the appearance of the mirror with changes in view angle.

Figure 5A:
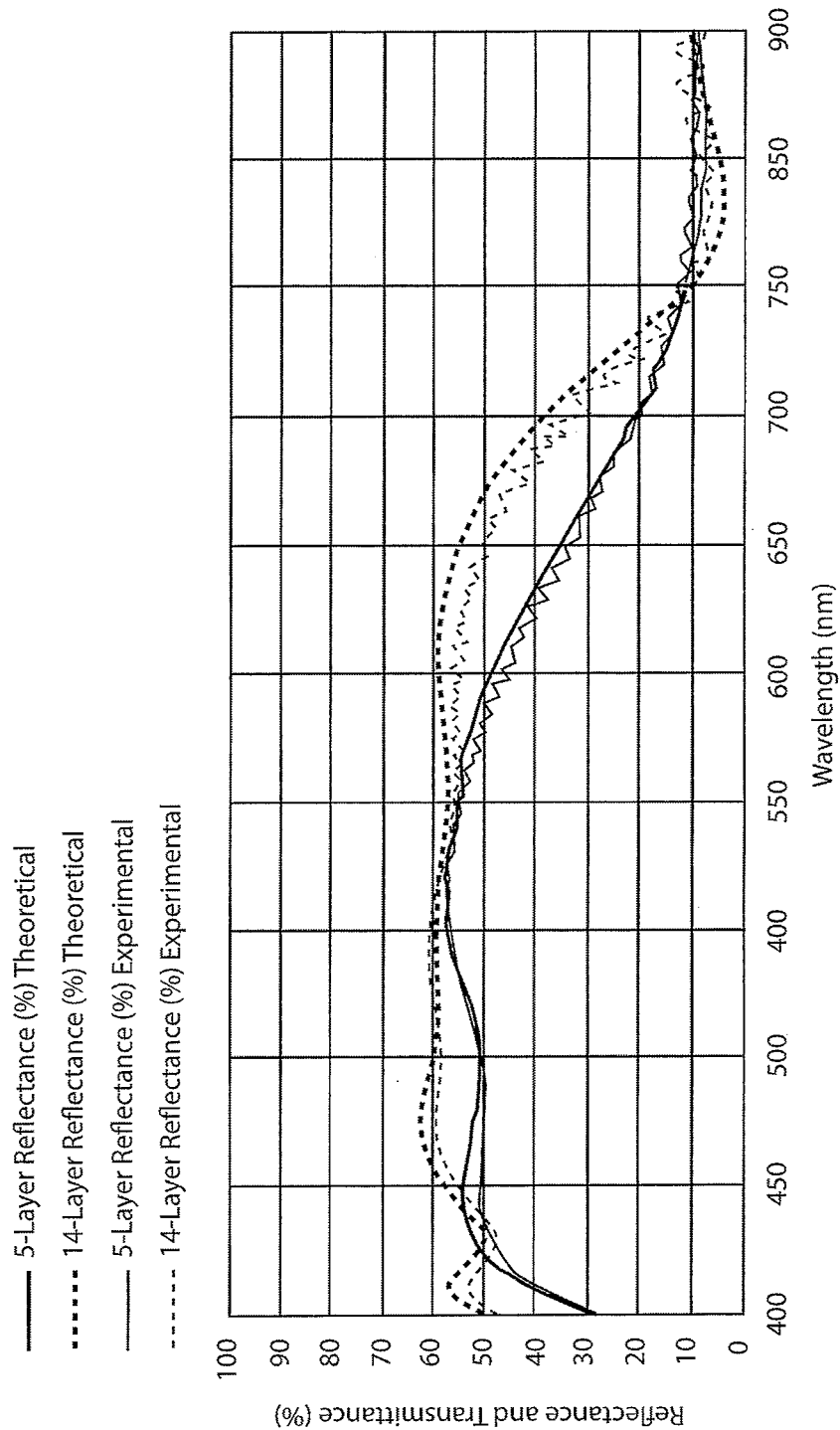
FIG. 5A is a graph illustrating the reflectance of a mirror assembly comprising multiple dielectric coatings.
Figure 5B:
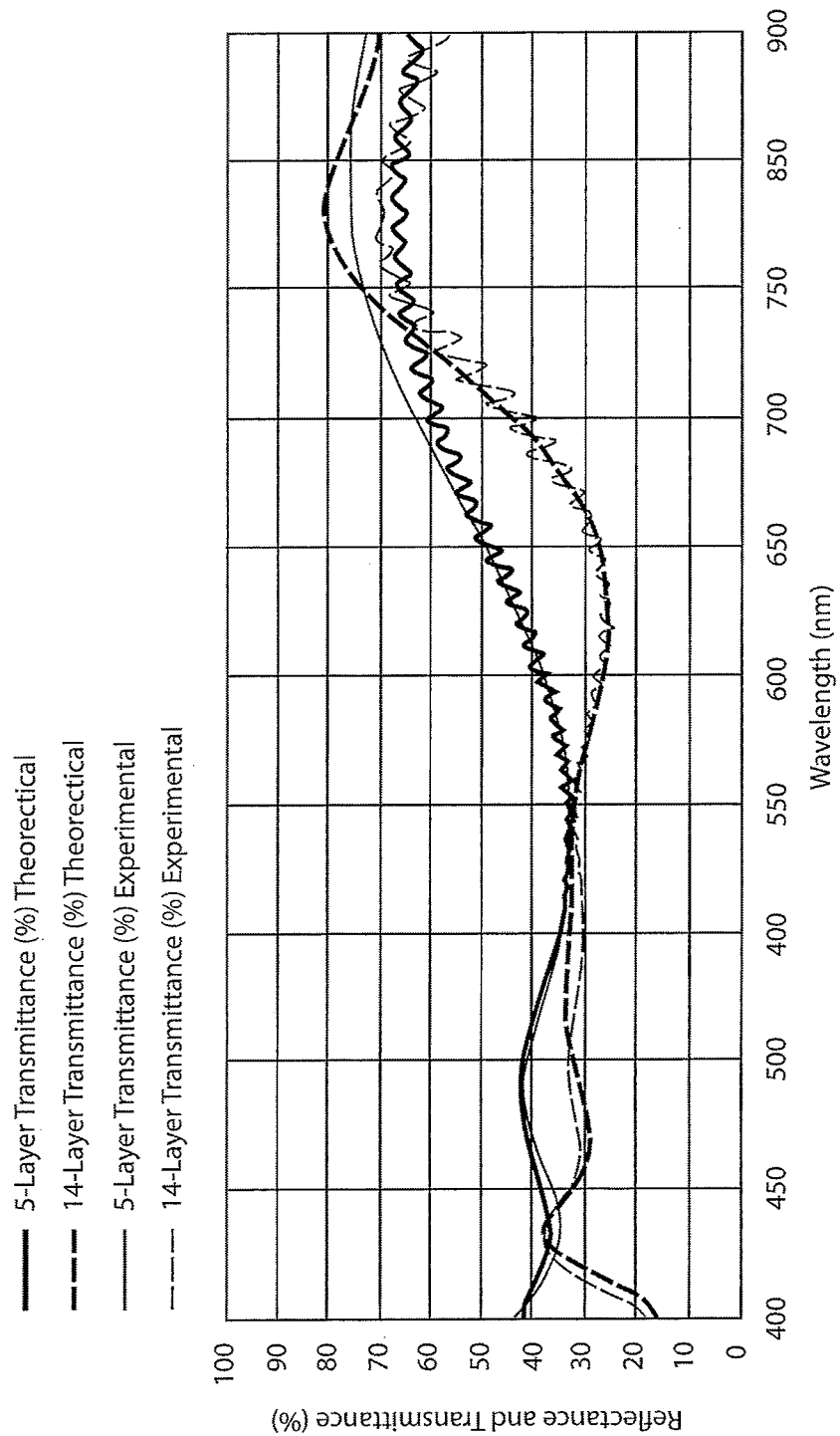
FIG. 5B is a graph illustrating the transmittance of a mirror assembly comprising multiple dielectric coatings.
Figure 6B:
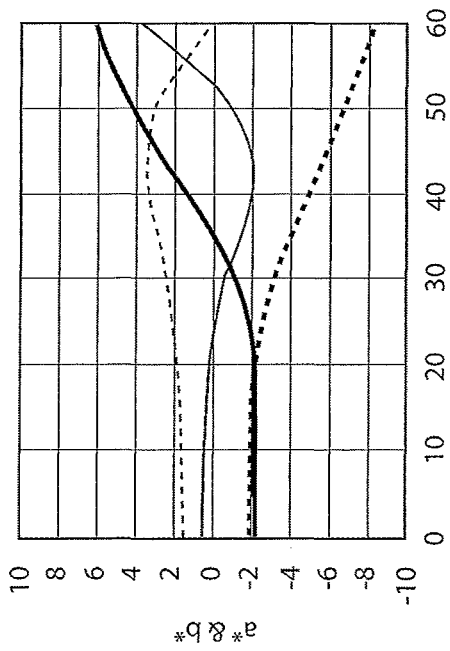
FIG. 6B is a graph illustrating a color performance as a function of viewing angle for a mirror assembly having a 14-Layer coating design in accordance with the disclosure.
Figure 6A:
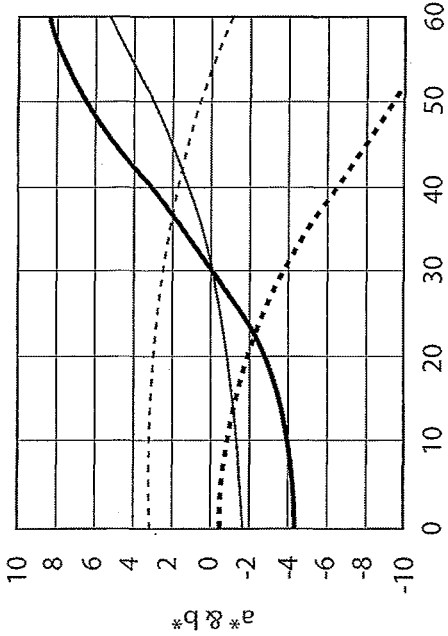
FIG. 6A is a graph illustrating a color performance as a function of viewing angle for a mirror assembly having a 5-Layer coating design.

The disclosure provides for a dielectric coating 40 with flat spectra in the visible range as shown in FIGS. 5A and 5B for reflectance and transmittance, respectively, which effectively suppresses color biasing resulting in a neutral reflected and transmitted color. As shown in FIG. 6A, a color performance of a mirror assembly with 5-Layer-Design is demonstrated. The mirror assembly may be capable of achieving neutral color ($|a^*|$, $|b^*|<5$) up to a 45 degree viewing angle for the transmitted color. The reflected $b^*$ color is quite stable with angle while the $a^*$ experiences a slightly larger change with angle. As shown in FIG. 6B, a color performance of a mirror assembly with a 14-Layer-Design is demonstrated. The mirror assembly may be tuned to balance the transmitted color up to a 55 degree viewing angle due to an extended flat spectrum. Such color suppressing for transmission spectrum may be critical for an embedded display. The slight green shift on $a^*$ of the reflection spectra for both examples is typically unnoticeable. In some coating variants, the $a^*$ value and $b^*$ value may change at different rates as the viewing angle is increased. The acceptable color shift can be expressed as $C^*$ which equals $Sqrt(a^{*2}+b^{*2})$. As the color shifts with angle the $C^*$ value may be less than about 10, less than about 7.5, or less than about 5.0. This will ensure that the color of the mirror is acceptable. The $a^*$ and $b^*$ values may shift with angle and the absolute values of the delta $a^*$ and delta $b^*$ values, for example $|a^*_{initial}-a_{final}|$, may be less than about 10, less than about 7.5 and less than about 5.0. The angle at which these conditions are met should be greater than about 35 degrees, or greater than about 45 degrees or greater than about 55 degrees.

TABLE 3

Visible optical properties of mirror with proposed coating designs at normal incidence:

| | 5-Layer Design | | 14-Layer-Design | |
|---|---|---|---|---|
| | Reflectance | Transmittance | Reflectance | Transmittance |
| Y | 55.18 | 36.25 | 58.81 | 32.36 |
| L* | 79.14 | 66.71 | 81.19 | 63.64 |
| a* | −0.38 | −4.43 | −2.23 | −2.25 |
| b* | 3.32 | −1.52 | 1.51 | 0.51 |

The disclosure provides for a dielectric coating 54 with acceptable visible properties applied to the fourth interface 4 of a mirror assembly 12 to provide for improved transmittance in the NIR range. The mirror assembly 12 may be utilized in various embodiments that may require high transmittance in the NIR range. In an exemplary embodiment, the disclosure may provide for a mirror assembly 12 that may be utilized with an eye-scan-identification system configured to securely identify an individual. The eye-scan-identification system may benefit from improved transmittance in the near NIR range that may be required to illuminate the eye for the identification.

In some embodiments, the mirror element 34 may be an electro-chromic element or an element such as a prism. One non-limiting example of an electro-chromic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Pat. No. 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety. To provide electric current to the electro-optic assembly 14, electrical elements are provided on opposing sides of the element, to generate an electrical potential therebetween. A J-clip 54 is electrically engaged with each electrical element, and element wires extend from the J-clips 54 to the primary PCB 28.

The present disclosure may be used with a mounting system such as that described in U.S. Pat. Nos. 8,814,373; 8,201,800; 8,210,695; 9,174,577; 8,925,891; and 9,838,653; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,814,373; 8,646,924; 8,643,931; 8,264,761; and 8,885,240; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the invention described herein may be comprised of one or more conventional processors and unique stored program instructions that control one or more processors to implement, in conjunction with certain non-processor circuits, some, most, or all of the functions of a mirror assembly 12, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electrochromic element comprising:
a first substrate comprising a first surface and a second surface;
a second substrate comprising a third surface and a fourth surface, wherein the first substrate and the second substrate form a cavity between the second surface and the third surface;
an electrochromic medium contained in the cavity; and
a transflective dielectric coating disposed on the fourth surface, wherein a near infrared transmittance through the electrochromic element exceeds a visible transmittance through the electrochromic element, wherein the near infrared transmittance corresponds to wavelengths between 800 nm and 940 nm and the visible transmittance comprises a visible color range comprising wavelengths of light from 400 nm to 700 nm, wherein an average of the visible transmittance through the electrochromic element is at least 20% and the electrochromic element is configured to transmit image data depicted on a display through the electrochromic element.

2. The electrochromic element according to claim 1, wherein the near infrared transmittance is at least 1.5 times greater than the visible transmittance.

3. The electrochromic element according to claim 1, wherein the transmittance of the transflective dielectric coating in the NIR range is greater than 30%.

4. The electrochromic element according to claim 1, wherein the transmittance of the transflective dielectric coating in the NIR range is greater than 50%.

5. The electrochromic element according to claim 1, wherein the transmittance of the transflective dielectric coating in the NIR range is greater than 70%.

6. The electrochromic element according to claim 1, wherein the transflective dielectric coating is configured in a stacked configuration of alternating high-index (H) and low-index (L) material in a multilayer stack (HL-Stack).

7. The electrochromic element according to claim 6, wherein the transflective dielectric coating comprises alternating layers of niobium oxide and silicon dioxide.

8. The system according to claim 6, wherein the difference in refractive index between the high-index (H) material and the low-index (L) material is greater than 0.4.

9. The system according to claim 6, wherein the multilayer stack comprises at least three layers of the high-index (H) and low-index (L) materials.

10. The system according to claim 6, wherein the dielectric coating corresponds to a low-loss dielectric material comprising one of niobium oxide, silicon oxide, tantalum oxide, and aluminum oxide.

11. The system according to claim 1, wherein the near infrared transmittance is 1.5 times greater than the visible transmittance.

12. An electrochromic mirror system comprising:
an electrochromic element comprising:
a first substrate comprising a first surface and a second surface;
a second substrate comprising a third surface and a fourth surface,
wherein the first substrate and the second substrate form a cavity between the second surface and the third surface;
an electrochromic medium contained in the cavity;
a transflective dielectric coating disposed at the fourth surface, wherein the transflective dielectric coating comprises a multi-layer stack comprising alternating high-index (H) material and low-index (L) material; and
an image sensor located rearward of the electrochromic element and directed toward the fourth surface, wherein a near infrared transmittance through the electrochromic element comprises a wavelength from 800 nm to 940 nm and a visible transmittance through the electrochromic element, wherein the near infrared transmittance exceeds the visible transmittance and the visible transmittance is at least 20% through the electrochromic element and wherein the visible transmittance of the electrochromic element comprises a shift in a green-red color coordinate (a*) and blue-yellow color coordinate (b*) of less than 5.

13. The system according to claim 12, further comprising an emitter in communication with the image sensor, wherein the emitter is configured to emit light at a wavelength approximately from 800 nm to 940 nm.

14. A method for operating an electrochromic mirror system comprising an electrochromic element, the electrochromic element comprising a first substrate comprising a first surface and a second surface, a second substrate comprising a third surface and a fourth surface, and an electrochromic medium disposed between the first substrate and the second substrate, wherein the electrochromic medium comprises a transflective dielectric coating disposed at the fourth surface, the method comprising:
emitting an output emission of a near infrared light at a wavelength approximately from 800 nm to 940 nm from an emitter through the electrochromic element and the transflective dielectric coating;
transmitting the near infrared light reflected from a subject through the electrochromic element and the transflective dielectric coating;
transmitting a visible light comprising wavelengths of light from 400 nm to 700 nm through the electrochromic element and the transflective dielectric coating concurrently with the near infrared light, wherein the transmission of the near infrared light exceeds a visible transmittance and an average transmission of the visible light is at least 20%; and
receiving via an image sensor the near infrared light and the visible light transmitted through the electrochromic element and the transflective dielectric coating.

15. The method according to claim 14, wherein at least 30% of the near infrared light is transmitted through the electrochromic element and the transflective dielectric coating.

16. The method according to claim 14, wherein the near infrared light is transmitted through the element and the transflective dielectric coating 1.5 times greater than the visible light.

* * * * *